United States Patent [19]

Vickers

[11] Patent Number: 5,048,665
[45] Date of Patent: Sep. 17, 1991

[54] DIVERTER MECHANISM

[75] Inventor: Derek Vickers, Carlingford, Australia

[73] Assignee: Dexion (Australia) Pty. Limited, Blacktown, Australia

[21] Appl. No.: 464,285

[22] Filed: Jan. 12, 1990

[30] Foreign Application Priority Data

Jan. 12, 1989 [AU] Australia .................... PJ2232

[51] Int. Cl.⁵ ............................................ B65G 47/46
[52] U.S. Cl. ................................. 198/350; 198/355; 198/364
[58] Field of Search ............. 198/349, 350, 355, 364, 198/367, 369, 372, 502.2

[56] References Cited

U.S. PATENT DOCUMENTS

| 3,104,004 | 9/1963 | Poel jet al. | 198/367 |
| 3,191,747 | 6/1965 | Pollard | 198/367 |
| 3,232,417 | 2/1966 | Muller | 198/367 |
| 3,429,417 | 2/1969 | Good et al. | 198/367 |
| 3,515,254 | 6/1970 | Gary | 198/502.2 |
| 3,791,518 | 2/1974 | Vanderhoof | 198/372 X |
| 3,955,678 | 5/1976 | Moyer | 198/372 X |
| 3,983,988 | 10/1976 | Maxted et al. | 198/367 X |
| 4,214,663 | 7/1980 | Schopp et al. | 198/372 X |
| 4,369,873 | 1/1983 | Heuft | 198/372 X |

FOREIGN PATENT DOCUMENTS 560857 1/1985 Australia .
2940014 11/1980 Fed. Rep. of Germany ...... 198/372

Primary Examiner—D. Glenn Dayoan
Attorney, Agent, or Firm—Christie, Parker & Hale

[57] ABSTRACT

A diverter mechanism, for use with a conveying system having a conveying surface along which articles are carried in a longitudinal direction, has an endless member that is at an oblique angle to the longitudinal direction, and has a plurality of diverter members mounted thereon. Articles to be diverted which are passing along the conveying surface are sensed, and a pivotable section of one diverter member is rotated about an axis substantially parallel to the endless member from a position where the entire diverter member lies beneath the conveying surface to a position where the pivotable section is above the conveying surface.

39 Claims, 7 Drawing Sheets

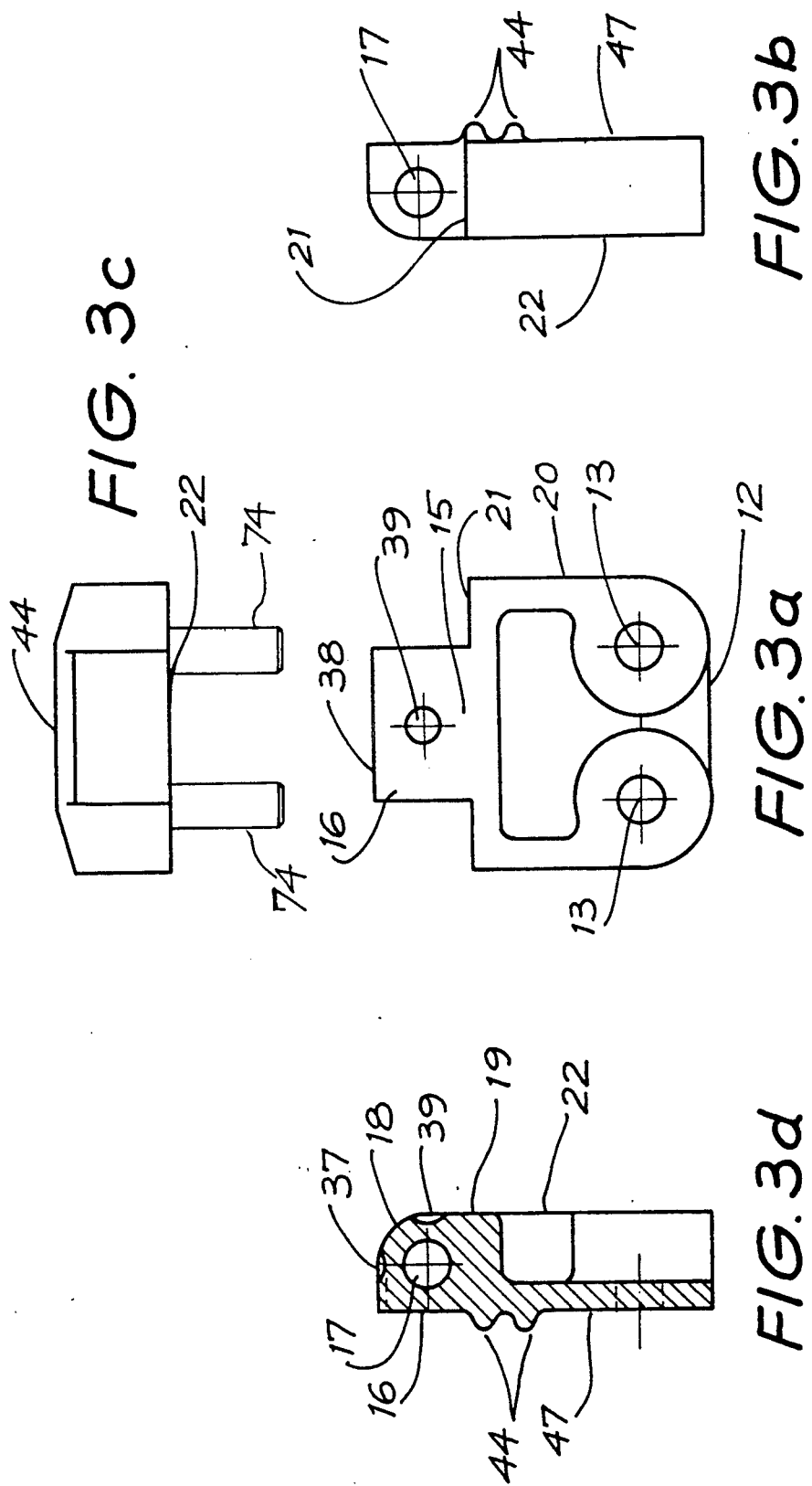

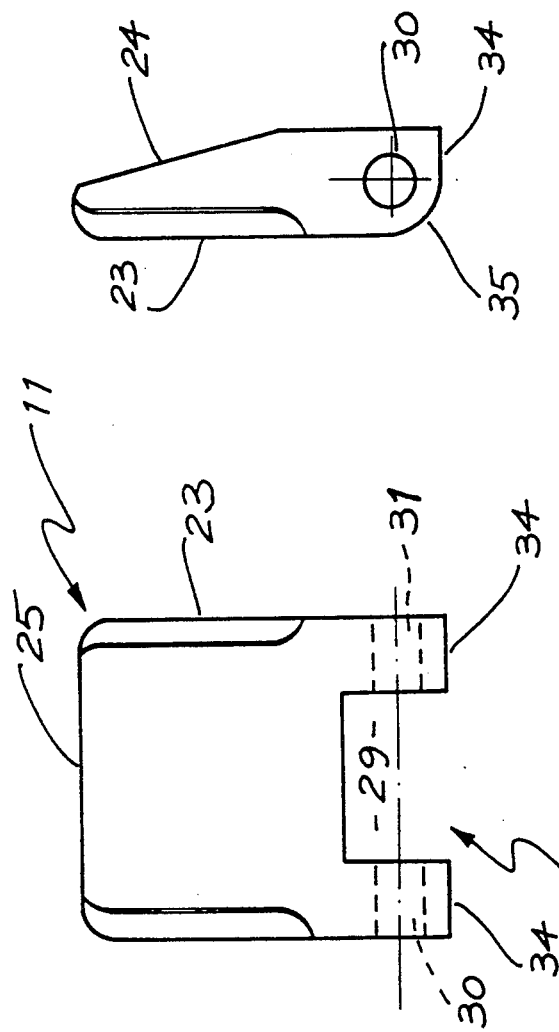
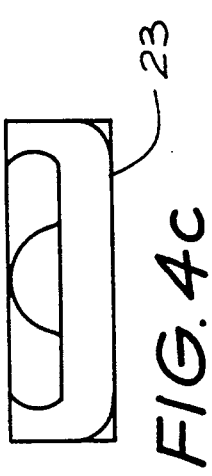
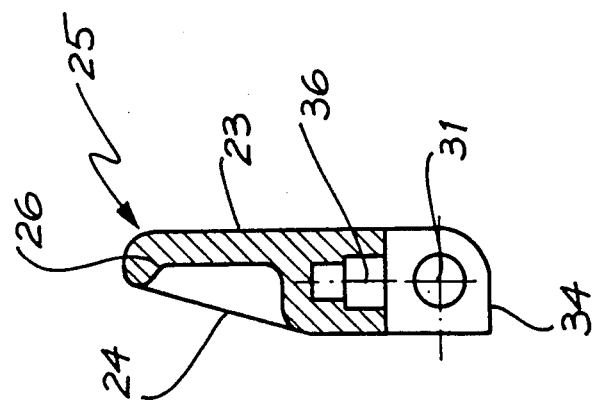
FIG. 4b
FIG. 4a
FIG. 4c
FIG. 4d

DIVERTER MECHANISM

BACKGROUND OF THE INVENTION

The present invention relates to the selective sorting of objects moving along a conveying surface such that objects may be selectively diverted at both high conveying speeds and with small separation between objects.

The present invention relates to a conveying system where a conveying surface is provided along which objects to be sorted travel in a longitudinal direction. A diverting structure is placed across the conveying surface such that objects may be sorted into two groups, those that are undiverted and continue along the conveying surface, and those that are diverted transversly off the conveying surface, usually onto another conveying surface.

In high-speed situations, the time and distance spacing between objects is reduced and thus the time allowed for diversion is reduced.

A known diverter system utilizes a pusher plate mounted on a hydraulic ram and acting transversely of the conveying surface. This system is only useful for slow-speed sorting, since high speed sorting reduces the time allowed for diverting. Consequently, the speed of operation of the pusher plate must also increase, but this causes high-speed impact of the pusher plate on the object to be diverted, causing damage. A further disadvantage is that the pusher plate must pass from one side of the conveyor to the other, to divert the object, and return across the conveyor before a second object may be diverted. During this "dead time" of the return stroke, an object to be diverted may pass the diverting pusher plate and will not be diverted. Thus, a large spacing between objects is necessary, again slowing conveying and sorting speed.

A slightly more refined diverting system utilizes an endless chain situated in a slot below the conveying surface and mounted on two sprockets, one on each side of the conveying surface. The chain is angled at approximately 45° to the conveying surface. Mounted on part of the chain are diverting members. The chain, in one position has these diverting members on its underside run, and not protruding above the conveying surface, allowing objects to pass, undiverted, over the conveying slot. Rotation of the sprockets will cause the diverting members to move to the upper run, presenting part of the diverting members above the conveying surface. An object travelling on the conveying surface shall contact these diverting members and, due to their angle to the longitudinal direction, shall be diverted sideways off the conveying surface. Again, since the diverting members are stationary, high-speed operation causes unacceptable damage and the mechanism also suffers from dead time, resulting in large spacing between objects.

Another prior art diverter system utilizes a chain which continuously rotates around two sprockets spaced under and across the conveying system. Both runs are beneath the conveying surface, and the sprockets are mounted on a framework which allows the sprockets to be raised such that the upper run is above conveying surface. The chain run is at an angle to the longitudinal direction. By choosing chain speed appropriate to the angle of the chain to the longitudinal direction and the conveying speed, each individual link shall have a speed in the longitudinal direction equal to the conveying speed. Thus, when diverting objects, the relative motion of the chain to object is a low-speed transverse one, reducing the impact and damage. While this system avoids damage through high speed impact, it still suffers "dead time" when the sprockets are being raised or lowered.

A further prior art system, described in Australian Patent No. 560857, utilizes a continuously moving chain rotating about sprockets at an angle to the conveying direction. Again, both runs are below the conveying surface but are fixed there. Mounted on the chain links are movable diverting members which, in a raised position, protrude above the conveying surface and divert objects as previously described, while in a lowered position do not protrude and do not divert.

This patent discloses two different movable diverter members. In the first system, the diverter members rotate in the plane of the chain, and thus a spacing between adjacent diverter members is required to allow for rotation from lowered to raised positions. This has the advantage of no dead time and low impact, but has the disadvantage of being unable to sort small objects due to the gaps between adjacent diverter members.

The second system utilizes diverter members sliding in a vertical plane parallel to the chain run between raised and lowered position. Each diverter member has a pin extending perpendicular to the plane of movement. In the raised position, the pin slides on the upper surface of a longitudinal bar. In the lowered position, the pin is below the bar. The lifter mechanism is at one end of this bar and selectively raises or lowers the diverter members. Since the pins must pass between upper and lower sides of the bar, there is a probability that a pin will not be moved sufficently and will jam on the end of the bar. This inhibits high speeds of operation.

SUMMARY OF THE INVENTION

It is thus an object of the present invention to provide a diverting system which allows high-speed sorting of small objects without dead time, a greatly reduced probability of jamming, and with reduced damage to the object to be sorted.

Accordingly the invention provides a conveying system with the following elements:

a conveying surface upon which articles are conveyed in a longitudinal direction;

an endless member passing linearly beneath the conveying surface from one edge to the other at an oblique angle to the longitudinal direction;

a plurality of diverter members mounted on the endless member, each diverter member at least partially pivotable about an axis substantially parallel to the endless member between a first position wherein all of the diverter member lies beneath the conveying surface, and a second position wherein at least part of the diverter member extends above the conveying surface;

means to move the diverter members between the first and second positions.

The invention also provides a diverter member for use in a diverting system comprising a conveying surface and an endless member passing obliquely across the conveying surface upon which a plurality of diverter members are mounted, the diverter member including the following elements:

a first section;

a mechanism for mounting the first section on the endless member such that said first section is pivotable about an axis substantially parallel to the endless member between a first position where the first section lies beneath the conveying surface, and a second position where at least part of the first section extends above the conveying surface.

The invention further provides a method of diverting articles conveyed along a conveying surface, including the following steps:
(a) providing an endless member moving beneath the conveying surface at an oblique angle thereto, having a plurality diverter members mounted thereon;
(b) sensing articles on the conveying surface to be diverted;
(c) selectively pivoting at least one diverter member about an axis substantially parallel to the endless member to position at least part of the at least one diverter above the conveying surface;
whereby articles are diverted.

Preferably, the endless member is a chain.

Preferably, the chain has a speed in the longitudinal direction equal to that of the conveying surface.

Preferably, the conveying surface is defined by a series of rollers.

BRIEF DESCRIPTION OF THE DRAWINGS

FIGS. 3a, 3b, 3c and 3d show various views of a part of the diverting structure of FIG. 2.

FIGS. 4a, 4b, 4c and 4d show various views of another part of the diverting structure of FIG. 2.

DETAILED DESCRIPTION OF A PREFERRED EMBODIMENT

Figure 1:
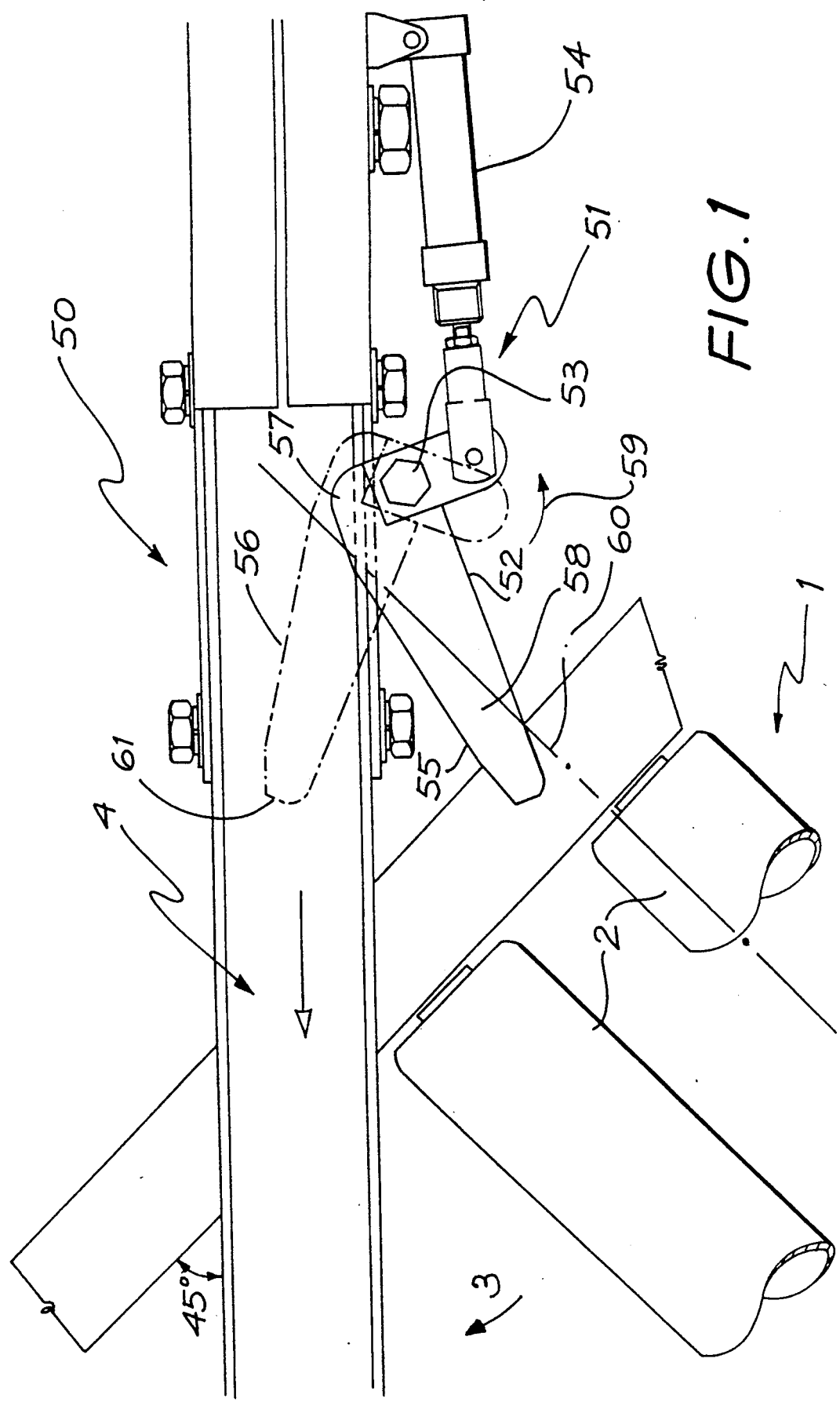
FIG. 1 shows a plan view of a conveying structure having a slot passing obliquely across the conveying surface in which a diverting structure may be mounted.
Figure 6:
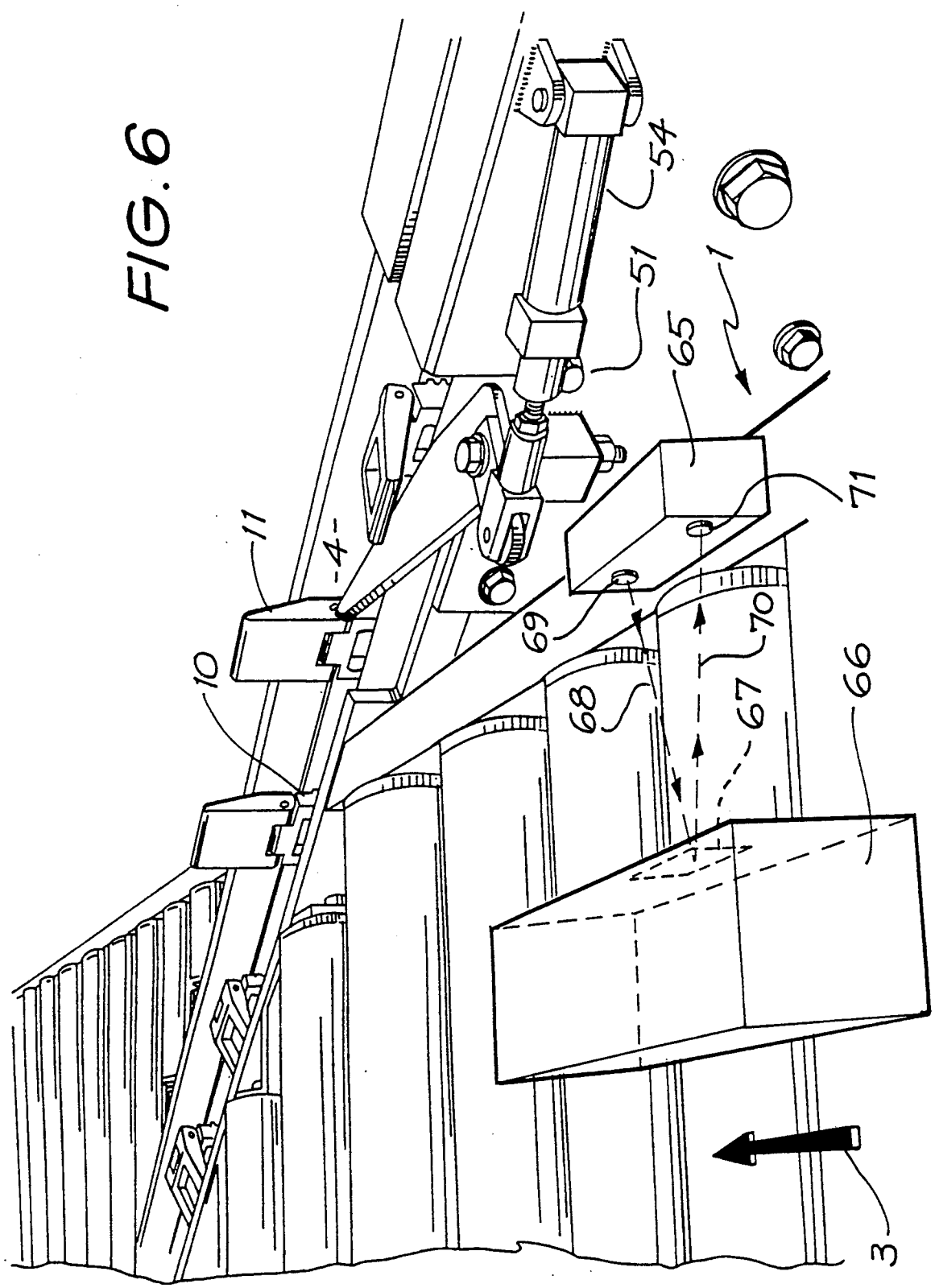
FIG. 6 is a perspective view of the conveying and diverting structures of FIG. 1.

The invention is preferably used with roller conveying systems and accordingly, as shown in FIGS. 1 and 6, there is a conveyor structure 1 having a plurality of parallel conveying rollers 2 which convey objects in a longitudinally extending plane indicated by arrow 3. Passing through this plane at an oblique angle to the longitudinal direction is a slot 4. Within this slot 4 is mounted a diverting structure (not shown in FIG. 1).

Figure 2:
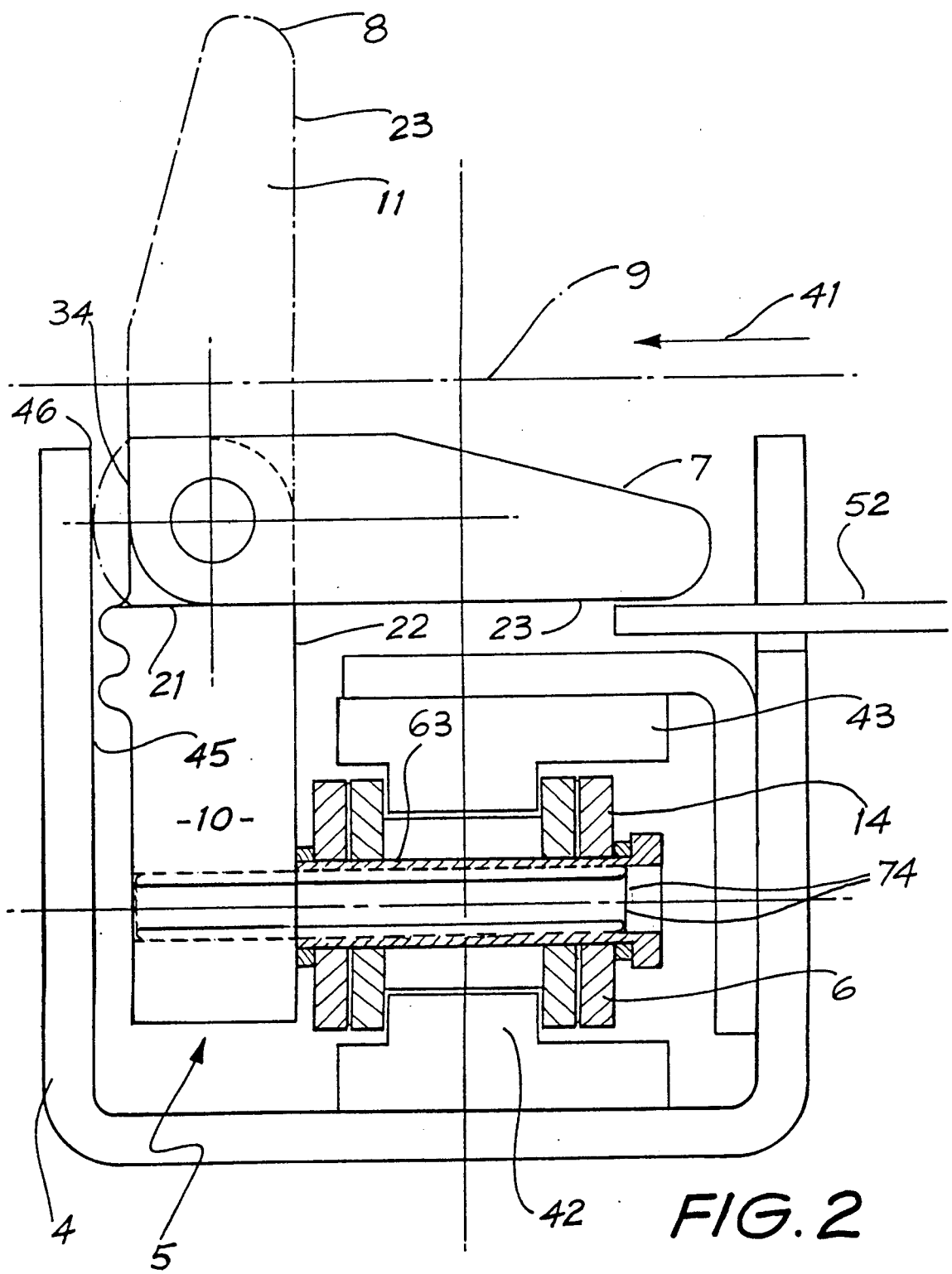
FIG. 2 shows a transverse cross section of the diverting structure of the present invention.

In the preferred form, the slot 4 is angled at 45° to the longitudinal direction 3, and an endless chain is continuously rotated about two sprockets at either side of the conveying surface. Referring to FIG. 2, a plurality of diverting members 5 are mounted on the chain 6 and are each movable between a lowered position 7, as indicated by the solid line in FIG. 2, and raised position 8, as indicated by the broken line in FIG. 2. In the lowered position 7, the diverting member 5 lies within the slot 4 and does not protrude above the conveying surface 9. Accordingly, an object moving along the conveying surface 9, upon reaching the slot, shall not be impeded, will pass over the slot, and will continue along the conveying surface.

In the raised position 8, the diverting member 5 protrudes above the conveying surface 9. An object passing along the conveying surface 9 will contact the diverting member 5 when it reaches the slot and will be unable to pass over the slot 4. The speed of the chain 6 along the slot 4 is approximately 1.4 times the speed of the conveying surface 9 and consequently, there is no relative movement in the longitudinal direction 3 between an object and the diverting member. There is, however, a transverse component of velocity, and so the diverting member 5 shall push the object sideways, off the conveying surface 9, either into a hopper or onto another conveying surface.

Each diverting member comprises two main parts, a mounting 10 and a diverting arm 11, pivotably secured together.

The mounting 10 is adapted to be mounted vertically on the side of a chain 6 with the diverting arm 11 pivoting about an axis parallel to the chain run. The diverting arm is pivotable through 90° between the horizontal position 7 and the upwardly extending vertical position 8.

Figure 7:
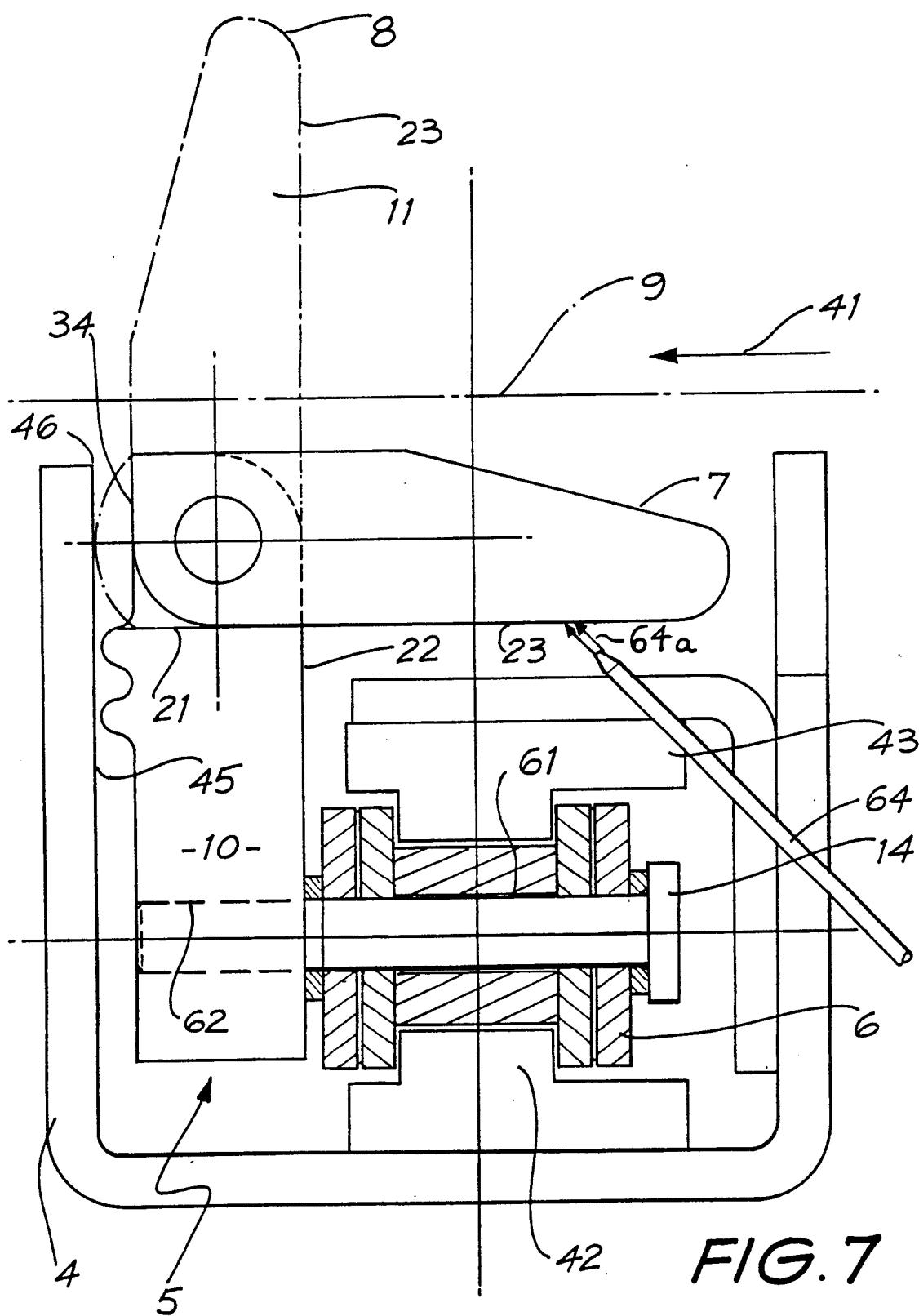
FIG. 7 is a view similar to FIG. 2, but of an alternate embodiment of the diverting structure of the present invention.

Referring to FIGS. 3a–3d the mounting 10 is substantially planar and rectangular. At one end 12 of the main body 20 are a pair of spaced holes 13, passing through the body of the mounting 10, by means of which the mounting may be secured to a link 14 of the chain 6. With a hollow pin chain, split clevis pins 74 may be inserted into the holes 13 and internally into the hollow pins 63, such that the clevis pins resiliently engage the hollow pins. A chain having extended link pins 61 may be used and the mounting holes 62 sized to receive the pins directly (see FIG. 7).

At the other end 15 of the mounting 10 is an extension 16 having a bore 17 passing therethrough. As shown in FIG. 3d the bore 17 is parallel to the chain run. The extension 16 has a curved surface 18, coaxial with the bore 17, on its inner surface 19, and the main body 20 has upper faces 21 on either side of the extension 15, perpendicular to the inner face 22.

The diverting arm 11, as shown in FIGS. 4a to 4d comprises a subsantially rectangular body having a planar inner face 23 and an outer face 24, partly angled to converge with the inner face 23. At the upper end 25 of the body, the inner and outer faces 23, 24 are joined by a curved surface 26.

At the lower end 28 of the body is a cutaway portion 29, adapted to receive the extension 16 of the mounting 10. Coaxial bores 30, 31 pass through the extending portions 32, 33 thus formed, positioned such that a pin (not shown) may pass through the bore 17 of the extension 16 and the bores 30, 31 of the arm 11, allowing the arm 11 and mounting 10 to pivot relative to each other. In the preferred form, the pin is a split clevis pin, and the bore 17 of the mounting extension 16 is slightly larger than the bores 30, 31. The clevis pin has a suitable diameter to securely engage the bores 30, 31, but not the bore 17 of the extension 16.

The arm 11 and mounting 10 are joined together with the inner surfaces 23, 22 substantially co-planar, as shown in FIG. 2. The upper surfaces 21 of the mounting are perpendicular to the plane of the mounting, as are the lower surfaces 34 of the arm 11. When the arm is co-planar with the mounting 10, these surfaces co-act to prevent arm 11 from over rotating, i.e., past the vertical position as shown in FIG. 2. The edge of the arm between the lower surfaces 34 and the inner surface 23 is a curved surface 35, coaxial with the bores 30, 31 which allows the arm 11 to pivot relative to the mounting 10 between the horizontal position 7 and vertical position 8. In the horizontal position 7, the inner surface 23 of the arm 11 and upper surfaces 21 of the mounting 10 co-act to prevent over-rotation of the arm 11 past the horizontal position 7.

To provide positive lockout of the arm 11 in the horizontal 8 and vertical 8 positions 7, 8, the arm 11 is provided with a spring-loaded ball (not shown) which is mounted in a bore 36 provided at the lower end 28 of the arm. The mounting extension 16 is provided with a spherical depression 37 on its upper surface 38 and a like depression 39 on its inner surface 19. The spring-loaded ball, when the arm is respectively vertical and horizontal, is pressed into these depressions 37, 39, releasably locking the arm at those positions. The curved surface 18 on the extension 16 allows the ball to move freely between the two depressions 37, 39, when necessary.

The chain 6 and diverter members 5 are mounted in the slot 4 running across the conveying surface with the inner face 23 of the diverter arm 11 facing upstream. Thus, referring to FIG. 2, objects approach the diverter in the direction of the arrow 41. When an object to be diverted is detected, the appropriate diverter arms are raised to the vertical position 8, as indicated by the broken lines.

When the object contacts the diverter arm 11, it attempts to push the diverter arm 11 backwards. Relative rotation of the arm 11 and mounting 10 is prevented, as previously described, and two additional features of the preferred embodiment prevent substantial deflection. Firstly, the chain 6 runs between upper and lower guides 42, 43 preventing horizontal deflection of the chain 6. However, due to the need for relatively frictionless travel of the chain 6, the tolerances between chain 6 and guides 42,43 allow rotation about the chain axis. To prevent this, the outer surface 47 of the mounting 10 is provided with two ridges 44 parallel to the direction of movement. Upon any twisting of the chain 6, these two ridges 44 will contact the slot wall 45, preventing further rotation and damage to the arm 11 from rubbing on the slot edge 46.

As previously mentioned, the outer surface 24 of the arm 11 converges with the inner surface 23 towards the upper edge 25. Thus, if the arm does not move fully to the horizontal position 7, the upper end 25 will not immediately protrude above the conveying surface 9. If the arm does protrude, the sloping nature of the face 24 and curved end 26 are such that an object passing along the conveying surface 9 will tend to knock the arm 11 back towards the horizontal position 7, rather than catching, raising the arm to the vertical position 8, and being erroneously diverted.

In use, the diverter members 5 normally travel across the conveying surface with the diverter arms horizontal and thus below the conveying surface 9. Unless raised, any objects passing along the conveying surface shall pass over the slot 4 and diverter members 5 without any diversion occuring.

The diverting system is provided with two sensors, (not shown) and a lifting mechanism 51 shown in FIGS. 1 and 4. The lifting mechanism 51 may be selectively actuated to raise one, or a series of diverting arms 5 from the horizontal to vertical positions.

The objects 66 to be sorted are provided with a readable code, usually a bar code 67. A first sensor 65 which can read the code 67 is located upstream of the diverting structure 50. As each object passes the sensor 65, the code 67 is read by means of reader elements 69, 71, which emit and receive light beams 68, 70, respectively and a control unit decides if the object is to be diverted or not. If the object 66 is to be diverted, the second sensor, located intermediate the first sensor 65, and the diverting structure is activated. The second sensor 73 senses the upstream and downstream edges of the object 66 and activates the lifting member, with a suitable time delay, when the downstream edge is detected. Similarly, the lifting mechanism is deactivated upon detection of the upstream edge.

The delay is such that the lifter mechansim is activated and deactivated when the downstream and upstream edges reach the line 60 in FIG. 1.

Since the speed of the chain 6 is preferably such that each diverter member 5 moves along the conveyor longitudinal direction 3 at the same speed as the object, the length of raised diverter arms 11 in the conveyor longitudinal direction 3 is at least equal to the object length in that direction. Thus, the diverter arms will contact the object along its entire length, lessening the destructiveness of the impact. Furthermore, although the object is most likely to rotate slightly, the diverter arms have a length greater along the slot direction than the object, and thus it will not rotate past the end of the diverter arms 11.

Since space between adjacent diverter members 5 is not required to allow rotation of the diverter arms, the diverter members are spaced closely together. This improves the minimum size of object which may be diverted. With no gaps between diverter members, the theoretical minimum size of object corresponds to approximately the size of the diverter arm 11. In practice, the size is limited by the spacing of conveying rollers 2 and the tendancy of objects to rotate when diverted. If an object of a size corresponding to one diverter member were diverted, it is probable that the diverter arm would contact the object off center, rotating the object, most possibly, around an edge of the arm 11 and consequently not diverting the object.

Figure 5:
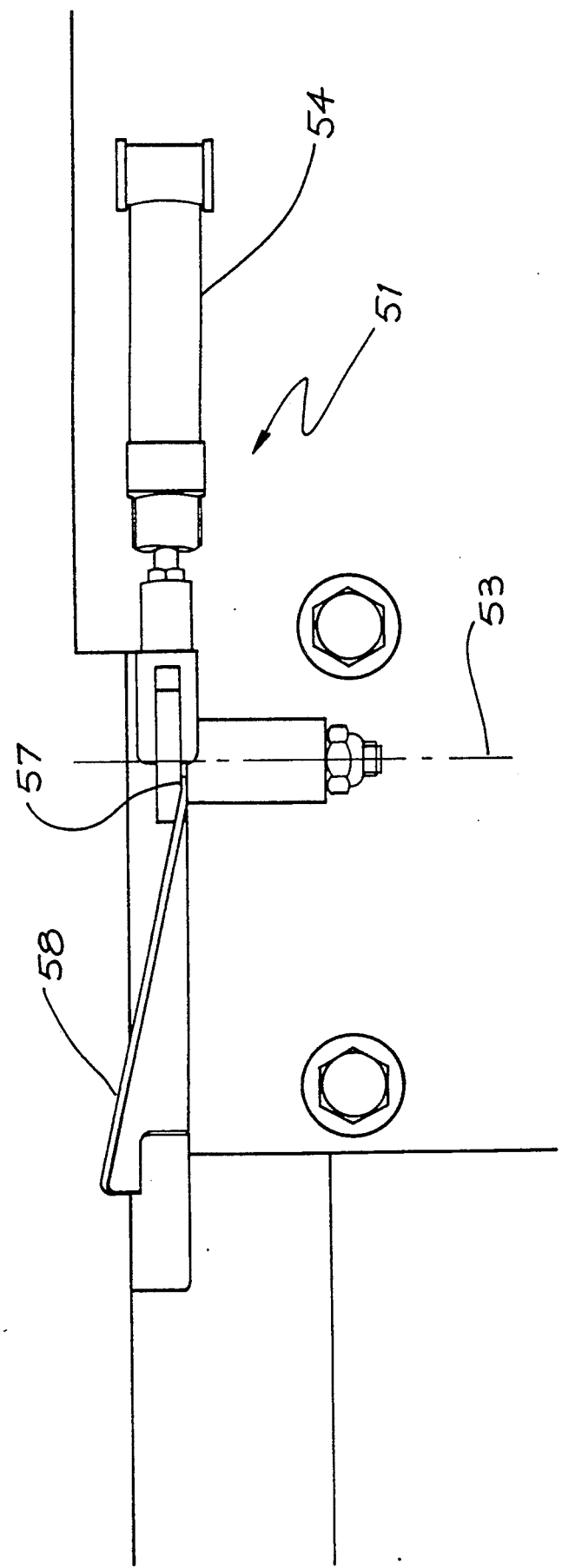
FIG. 5 shows a side view of an actuating device for selectively positioning diverter members of the present invention.

As shown in FIGS. 1 and 5, the lifting mechansim 51 comprises a lifter plate 52 pivotable about a vertical axis 53, rotation of the plate being controlled by a ram 54 between a first position 55 and a second position 56. The ram 54, as shown, is pneumatically, hydraulically, or electrically (e.g., a solenoid) operated. The lifter plate 52 comprises a piece of sheet metal bent such that a first section 57 is horizontal while the second section 58 is upwardly raised in an anticlockwise circumferential direction indicated by arrow 59.

The lifter plate 52 is located just upstream of the slot 4 and at the edge of the conveyor 1 before the diverter members 5 pass across the conveyor surface 9. In FIG. 1, the chain 6 and the diverter members 5 are not shown in the slot 4 such that one can see that the horizontal portion 57 of the lifter plate 52 always protrudes into the slot 4. The lifter plate 52 is positioned below the surface 23 of the diverter arms, as shown in FIG. 2. In the first position 55, only the horizontal section 57 of the lifter plate 52 is located under the diverter arms 11 and thus, as they progress over the lift plate, remain undisturbed and in their lowered position 7.

When an object to be diverted is detected, the pneumatic ram 54 is actuated, rotating the lifter plate 52 to the second position, 56. In this position the raised portion 58 is also underneath the diverter arms 11. As the arms 11 progress along the slot 4, the lifter plate 52 progressively pivots them until when the arms 11 are at the free end 61 of the lifter plate 52 they are at the upright position 8 as indicated in FIG. 2.

While the lifter plate is at the second position 56, all diverter arms 11 passing over it will be raised, creating a barrier to the object to be diverted. By controlling the lifter plate 52 only to raise sufficient arms 11 to divert the object, the width of the conveying surface remains substantially unimpeded, allowing closer object spacing to be achieved. The lifter plate 52 has been found to be incapable of jamming on the moving diverter members 5. Since the lifter plate 52 is always underneath the diverter arms 11 as the lifter plate is rotated, the arms 11 merely rotate to accommodate the raised surface. The only point of possible jamming is between adjacent diverter arms 11. However, for the lifter plate 52 to jam there, one of the two adjacent arms must somehow move from being above the plate to below it, which is effectively impossible. This in turn allows high-speed switching of the lifting mechanism, again improving the high-speed capability of the total system.

As an alternative, the lifting mechanism 51 may be replaced with an air jet 64 located below the diverting members 5, to release a jet of air 64a to move the diverting member from its lowered to its raised position, at an appropriate time.

In the preferred embodiment, the diverter member comprises two parts, 10 and 11. However, the invention also includes a diverter member comprised of a single section. The endless member, such as a chain, could include a mounting corresponding to section 10 of the diverter member. A single section similar to section 11 would mount directly on the endless member and pivot relative to it.

It will be obvious to those skilled in the art that many variations or modifications may be made without departing from the spirit or scope of the invention.

I claim:

1. A conveying system comprising:
    a conveying surface for conveying articles in a longitudinal direction;
    an endless member passing linearly beneath the conveying surface at an oblique angle to the longitudinal direction;
    a plurality of diverter members mounted on the endless member, at least part of each diverter member pivotable about an axis substantially parallel to the endless member between a first position, wherein all of the diverter member lies beneath the conveying surface, and a second position wherein at least part of the diverter member extends above the conveying surface; and
    means to selectively move diverter members between said first and second positions.

2. The system of claim 1 wherein each of said diverter members comprises a first section rigidly attached to said endless member, and a second section pivotably connected to said first section.

3. The system of claim 1 or claim 2 wherein said diverter members are detachable from said endless member.

4. The system of claim 1 wherein the endless member is a chain.

5. The system of claim 4 wherein the chain has hollow link pins and said diverter members have pins for resiliently engaging the hollow pins.

6. The system of claim 4 wherein the chain has pins extending on one side thereof, and the diverter members are mounted on the extending pins.

7. The system of claim 1 wherein the endless member has a velocity component in the longitudinal direction equal to that of the conveying surface.

8. The system of claim 1 wherein said first position is at 90° to said first position.

9. The system of claim 1 wherein said first position is parallel to said conveying surface.

10. The system of claim 1 wherein the diverter members are mounted on the downstream side of the endless member.

11. The system of claim 1 wherein the endless member is located in a slot, and the downstream side of the diverter members include ridges for rubbing on a surface of the slot.

12. The system of claim 1 wherein the endless member is guided by guide means.

13. The system of claim 2 wherein said second section, when in said first position, has an upper face extending upwardly in a downstream direction.

14. The system of claim 1 wherein the means to selectively move said diverter members includes an actuator plate having a first section parallel to the conveying surface and an upwardly turned second section, said actuator plate being movable between a first position wherein only said first section is underneath the pivotable part of the members, and a second position wherein the second section is underneath the pivotable part of the member, thereby pivoting said parts to the second position.

15. The system of claim 14 wherein the plate is pivotable.

16. The system of claim 15 wherein the plate is pivotable about a vertical axis.

17. The system of claim 1 wherein the means for selectively moving includes electrical, pneumatic or hydraulic means.

18. The system of claim 1 wherein the means for moving comprise means for getting air.

19. The system of claim 1 further including sensor means for sensing articles.

20. The system of claim 19 wherein the sensor includes a light beam and the means for selectively moving the diverter members when the light beam is interrupted by an article to be diverted.

21. The system of claim 19 or claim 20 further including means for reading destination codes on the articles.

22. A diverter member for use in a diverting system comprising a conveying surface and an endless member passing obliquely beneath the conveying surface upon which a plurality of diverter members are mounted, the diverter member comprising:
    a first section;
    means for mounting said first section on said endless member pivotable about an axis substantially parallel to the endless member between a first position where the first section lies beneath the conveying surface, and a second position where at least part of the first section extends above the conveying surface.

23. The diverter member of claim 22 wherein said means for mounting comprises a second section rigidly attachable to said endless member, said first section pivoting on said second section.

24. The diverter member of claim 23 wherein said second section further includes two spaced-apart bores for receiving complementary pins extending from the endless member.

25. The diverter member of claim 23 wherein said second section further includes two spaced apart pins, for being received by complementary bores in said endless member.

26. The diverter member of claim 25 wherein the pins comprise clevis pins.

27. The diverter member of claim 23 wherein said first and second positions are at 90° to each other.

28. The diverter member of claim 23 wherein at one of said positions said two sections are substantially coplanar.

29. The diverter member of claim 22 wherein the first section, when in said first position has an upper surface shaped to reduce in height above the conveying surface in a downstream direction.

30. The diverter member of any one of claims 23 to 29 wherein one of said sections has means biased to engage indents on the other of said sections to releasably lock said member at said first or second position.

31. The diverter member of claim 22 wherein said means for mounting comprises a second section, said first section pivoting on said second section, and said section having at least one bore formed therein for receiving a pin mounted on said endless member.

32. A method of diverting articles conveyed along a conveying surface, comprising:
  (a) providing an endless member, moving beneath the conveying surface at an oblique angle thereto, and having a plurality diverter members mounted thereon;
  (b) sensing articles on the conveying surface to be diverted; and
  (c) selectively pivoting at least part of at least one diverter member about an axis substantially parallel to the endless member to position said at least part of said at least one diverter above the conveying surface;
whereby articles are diverted.

33. The method of claim 32 wherein step (c) comprises pivoting a first section of at least one diverter member.

34. The method of claim 32 wherein step (c) includes activating a lifting mechanism.

35. The method of claim 34 wherein said activating a lifting mechanism includes releasing an air jet.

36. The method of claim 34 wherein said activating a lifting mechanism comprises rotating a lifter plate to contact and pivot said part of said diverter member.

37. The method of claim 32 wherein step (b) includes sensing the length of said articles in said longitudinal direction.

38. The method of claim 32 wherein step (b) also includes reading destination codes on said articles.

39. The method of any one of claims 32 to 38 further including preventing transverse displacement of the member.

* * * * *

UNITED STATES PATENT AND TRADEMARK OFFICE
CERTIFICATE OF CORRECTION

PATENT NO.  :  5,048,665
DATED       :  September 17, 1991
INVENTOR(S) :  Derek Vickers It is certified that error appears in the above-identified patent and that said Letters Patent is hereby corrected as shown below:

On the title page, Item [56], Reference Cited

U.S. Patent Documents, change "Poel jet al." to
-- Poel et al. --.

Column 1, line 16, change "transversly" to
-- transversely --.
Column 1, line 63, before "conveying" insert -- the --.

Column 2, line 27, change "position" to -- positions --.

Column 3, line 13, after "plurality" insert -- of --.

Column 4, line 44, change "subsantially" to
-- substantially --.

Column 5, line 34, change "Firstly" to -- First --.

Column 6, line 37, change "tendancy" to -- tendency --.
Column 6, line 67, after "position" delete the comma.

UNITED STATES PATENT AND TRADEMARK OFFICE
CERTIFICATE OF CORRECTION

PATENT NO. : 5,048,665

DATED : September 17, 1991

INVENTOR(S) : Derek Vickers

It is certified that error appears in the above-identified patent and that said Letters Patent is hereby corrected as shown below:

In the Claims

Column 8, line 41, change "comprise" to -- comprises --.

Column 10, line 1, after "plurality" insert -- of --.

Signed and Sealed this

Thirtieth Day of March, 1993

Attest:

STEPHEN G. KUNIN

*Attesting Officer*    Acting Commissioner of Patents and Trademarks